US009842417B2

(12) United States Patent
Wu et al.

(10) Patent No.: US 9,842,417 B2
(45) Date of Patent: Dec. 12, 2017

(54) COMPUTING DEVICE AND METHOD FOR SIMPLIFYING POINT CLOUD OF OBJECT

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin-Yuan Wu, Shenzhen (CN); Peng Xie, Shenzhen (CN); Lu Yang, Shenzhen (CN); Chih-Kuang Chang, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 309 days.

(21) Appl. No.: 14/734,595

(22) Filed: Jun. 9, 2015

(65) Prior Publication Data

US 2016/0117858 A1    Apr. 28, 2016

(30) Foreign Application Priority Data

Oct. 23, 2014    (CN) .......................... 2014 1 0572692

(51) Int. Cl.
| *G06T 17/00* | (2006.01) |
| *G06T 11/20* | (2006.01) |
| *G06T 17/30* | (2006.01) |
| *G06T 17/20* | (2006.01) |

(52) U.S. Cl.
CPC .............. *G06T 11/20* (2013.01); *G06T 17/00* (2013.01); *G06T 17/205* (2013.01); *G06T 17/20* (2013.01); *G06T 17/30* (2013.01); *G06T 2207/10028* (2013.01); *G06T 2210/56* (2013.01)

(58) Field of Classification Search
CPC ....... G06T 17/20; G06T 17/205; G06T 17/30; G06T 2207/10028; G06T 2210/56; G06T 17/00; G06T 11/20
See application file for complete search history.

(56) References Cited

U.S. PATENT DOCUMENTS

| 8,793,107 B2* | 7/2014 | Miller ..................... G06T 17/00 382/154 |
| 2003/0112239 A1* | 6/2003 | Shin ........................ G06T 17/20 345/428 |
| 2015/0009214 A1* | 1/2015 | Lee .......................... G06T 17/10 345/420 |

OTHER PUBLICATIONS

Lee et al. , Point Data Reduction Using 3D Grids, 2001, pp. 201-210.*

* cited by examiner

*Primary Examiner* — Robert Craddock
(74) *Attorney, Agent, or Firm* — Steven Reiss

(57) ABSTRACT

In a method for simplifying point clouds of an object using a computing device, a point cloud of the object is obtained from a scanning device connected to the computing device, and the point cloud is meshed into triangulated grids. The triangulated grids are selected from the point cloud, and a number of simplification passes to simplify the triangulated grids is received from an input device. The triangulated grids of triangles are classified according to a shape of each grid and a location of each grid in the point cloud. Each type of triangulated grid is simplified to obtain simplified grids by performing a loop triangular grid function with the number of simplification passes. The simplified grids are smoothed and the cloud model of the object can be displayed.

15 Claims, 4 Drawing Sheets

COMPUTING DEVICE AND METHOD FOR SIMPLIFYING POINT CLOUD OF OBJECT

CROSS-REFERENCE TO RELATED APPLICATIONS

This application claims priority to Chinese Patent Application No. 201410572692.7 filed on Oct. 23, 2014, the contents of which are incorporated by reference herein.

FIELD

The subject matter herein generally relates to point cloud processing technology, and particularly to a computing device and a method for simplifying point clouds of an object.

BACKGROUND

A scanning device can measure a plurality of points to generate point clouds by scanning a surface of an object (e.g., a component of a mobile phone). However, if the point clouds obtained from the scanning device are not simple enough, a real 3D model of the object cannot be created using the obtained point clouds. Therefore, simplification of the point clouds obtained from the scanning device is required.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
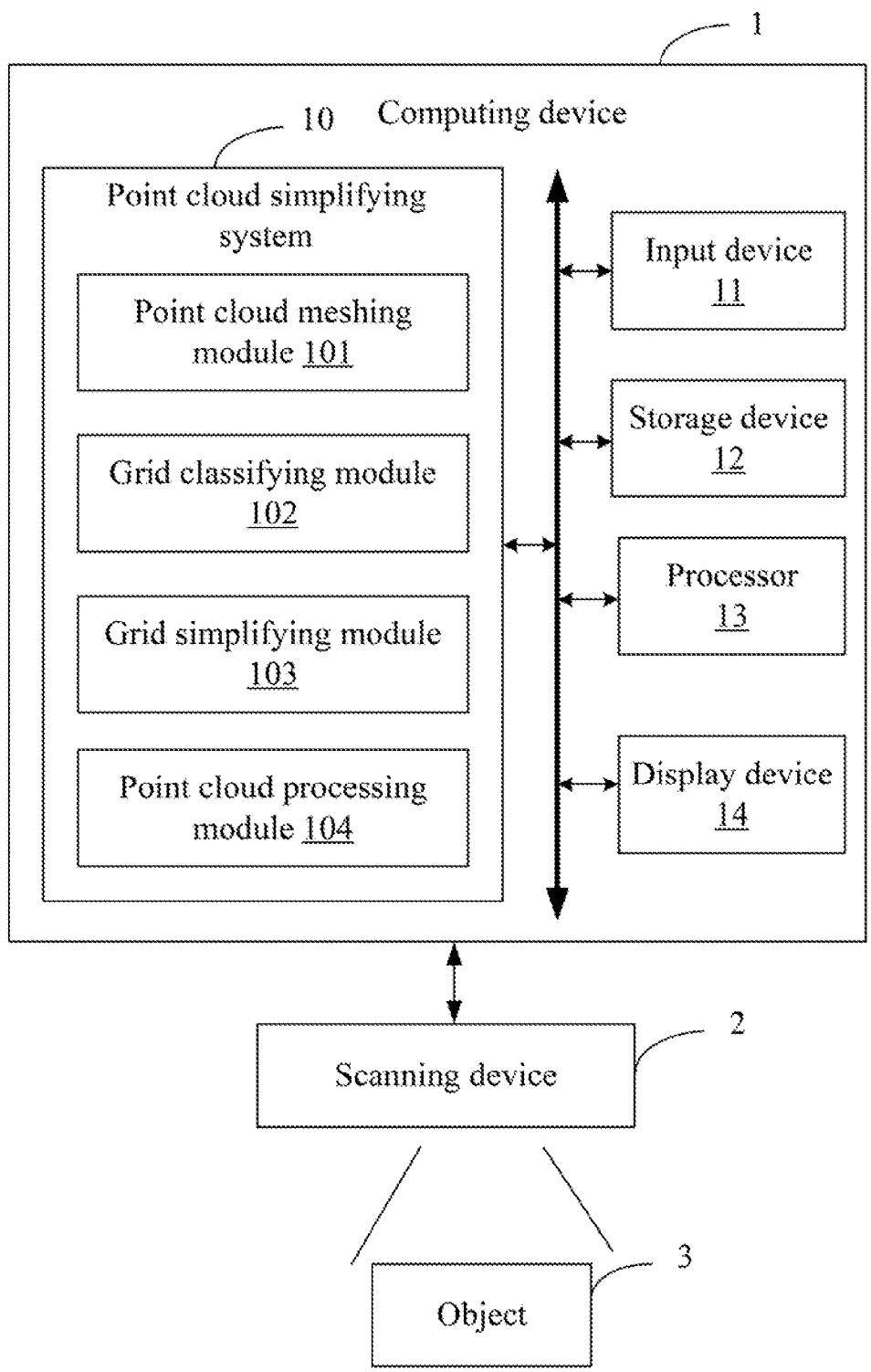
FIG. 1 illustrates a block diagram of one example embodiment of a hardware environment for executing a point cloud simplifying system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 is a block diagram of one example embodiment of a hardware environment for executing a point cloud simplifying system 10. In the embodiment, the point cloud simplifying system 10 is installed in and run by a computing device 1. The computing device 1 comprises, but is not limited to, an input device 11, a storage device 12, at least one processor 13, and a display device 14. In one embodiment, the computing device 1 can be a desktop computer, a server, a workstation computer, a measurement machine (e.g., a computer numerical control (CNC) machine) or any other electronic device which has calculation capability. The point cloud simplifying system 10 can comprise computerized instructions in the form of one or more computer-readable programs which can be stored in the storage device 12 and executed by the at least one processor 13. FIG. 1 illustrates only one example of the computing device 1, and other examples can comprise more or fewer components than those shown in the embodiment, or have a different configuration of the various components.

In at least one embodiment, one or more operating systems (e.g., WINDOWS OS or LINUX OS) and various applications (e.g., user applications and application software) can be installed in the computing device 1. The computing device 1 connects to a scanning device 2 through a communication connection or a communication network including a wired network or a wireless network. The scanning device 2 is configured to measure a plurality of points of an object 3 to generate a point cloud by scanning a surface of the object 3, and store the point cloud of the object 3 in the storage device 12. In at least one embodiment, the point cloud can be a set of points representing the external surface of the object 3. The object 3 can be, but is not limited to, a component (e.g., a shell) of an electronic device (e.g., a mobile phone). In at least one embodiment, the point cloud includes data of, but is not limited to, three dimensional coordinates of the measured points, identifications of the points, and a total number of the points.

In at least one embodiment, the input device 11 can be a keyboard, a mouse, or a touch screen. The storage device 12 may be an internal storage system, such as a flash memory, a random access memory (RAM) for temporary storage of information, and/or a read only memory (ROM) for permanent storage of information. The storage device 12 may also be an external storage system, such as an external hard disk, a storage card, or a data storage medium. The at least one processor 13 executes one or more computerized codes and other applications of the computing device 1 to provide functions of the point cloud simplifying system 10. The at least one processor 13 is a central processing unit (CPU) or microprocessor that performs various functions of the computing device 1. The display screen 40 can display any data of the computing device 1 in visual form.

In the embodiment, the point cloud simplifying system 10 includes, but is not limited to, a point cloud meshing module 101, a grid classifying module 102, a grid simplifying module 103, and a point cloud processing module 104. The modules 101-104 may comprise computerized instructions in the form of one or more computer-readable programs that are stored in a non-transitory computer-readable medium (such as the storage device 12) and executed by the at least one processor 13. The modules 101-104 can include computerized instructions to execute the method as described below and in relation to FIG. 2.

Figure 2:
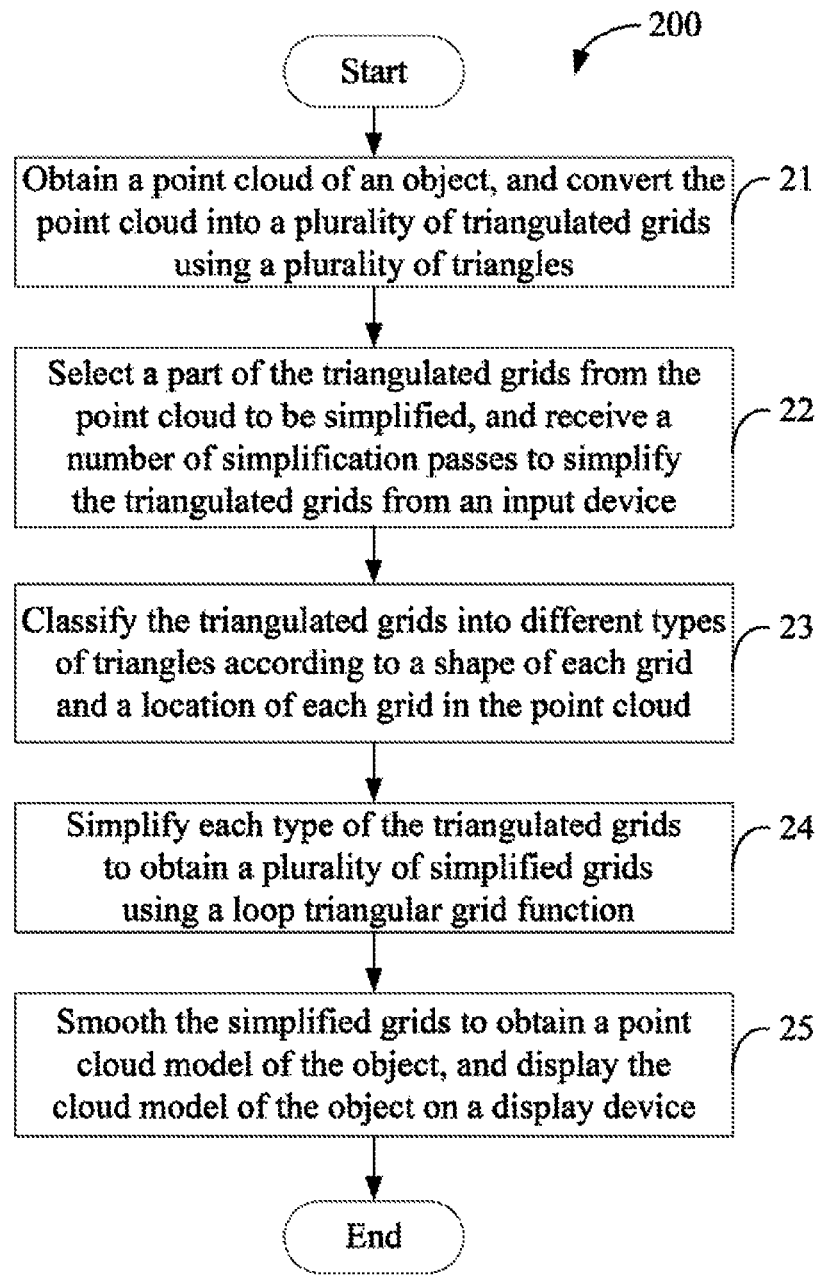
FIG. 2 illustrates a flowchart of an example embodiment of a method for simplifying point clouds of an object.

FIG. 2 illustrates a flowchart of an example embodiment of a method for simplifying point clouds of an object. In the example embodiment, the method 200 is performed by execution of computer-readable software program codes or instructions carried out by at least one processor of an electronic device, such as the computing device 1 of FIG. 1.

Referring to FIG. 2, a flowchart is presented in accordance with an example embodiment. In the embodiment, the example method 200 is provided by way of example only as there are a variety of ways to carry out the method. The method 200 described below can be carried out using the configurations illustrated in FIG. 1, for example, and various elements of the figure are referenced in explaining the example method 200. Each block shown in FIG. 2 represents one or more processes, methods, or subroutines, carried out in the exemplary method 200. Furthermore, the illustrated order of blocks is by example only and the order of the blocks according to the present disclosure can be changed. Additional blocks may be added or fewer blocks may be utilized, without departing from this disclosure. The exemplary method 200 can begin at block 21.

Figure 3A:
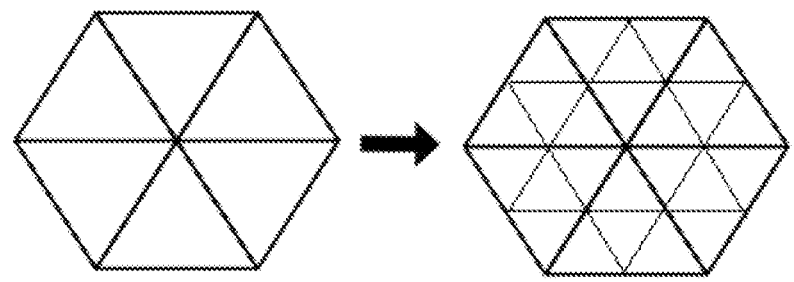
FIG. 3A and FIG. 3B are diagrams illustrating one embodiment of classifying the triangulated grids in the point cloud.
Figure 3B:
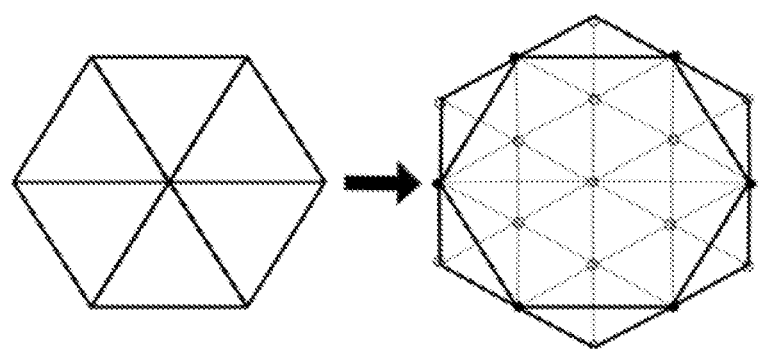

At block 21, the point cloud meshing module 101 obtains a point cloud of the object 3, and converts the point cloud into a plurality of triangulated grids using a plurality of triangles. In at least one embodiment, the point cloud of the object 3 can be obtained by scanning a surface of the object 3 using the scanning device 2, or the point cloud can be obtained from the storage device 13 of the computing device 1. The point cloud of the object 3 can be a set of measured points representing the external surface of the object 3. The object 3 can be, but is not limited to, a component (e.g., a shell) of an electronic device (e.g., a mobile phone). The point cloud includes data of, but not limited to, three dimensional coordinates of measured points of the point cloud, identifications of the points, and a total number of the points. Referring to FIG. 3A and FIG. 3B, the triangulated grids can be meshed according to the dimensional coordinates of each point in the point cloud.

At block 22, the grid classifying module 102 selects a part of the triangulated grids from the point cloud to be simplified, and receives a number of simplification passes (for example, N times) to simplify the triangulated grids from the input device 11. In at least one embodiment, the greater the number of simplification passes, the more precise the simplification of the point cloud. In one example, in the embodiment, the number of simplification passes can be two times according to user's requirements.

At block 23, the grid classifying module 102 classifies the triangulated grids into different types of triangles according to a shape of each grid and a location of each grid in the point cloud. In at least one embodiment, each of the triangulated grids is classified using a vertex classifying method and a plane classifying method. FIG. 3A is a diagram illustrating one embodiment of classifying the triangulated grids in the point cloud using the vertex classifying method. In the embodiment, if the point cloud has n numbers of points, the grid classifying module 102 determines each n numbers of points as a vertex of a triangle using the vertex classifying method. For example, FIG. 3A shows how the object to the left is classified into 6 triangles, and each of the six triangles are themselves broken into a grid of 4 triangles by the vertex classifying method. FIG. 3B is a diagram illustrating one embodiment of classifying the triangulated grids in the point cloud using the plane classifying method. In the embodiment, each of the triangulated grids has three edges which form a triangulated plane of the triangulated grid, the grid classifying module 102 divides each triangulated plane of the triangulated grid into two triangles using the plane classifying method.

At block 24, the grid simplifying module 103 simplifies each type of triangulated grid to obtain a plurality of simplified grids using a loop triangular grid function. In at least one embodiment, each type of triangulated grid is simplified by performing the loop triangular grid function with the number of simplification passes, for example, N times. The loop triangular grid function is hereinafter described.

Figure 4A:
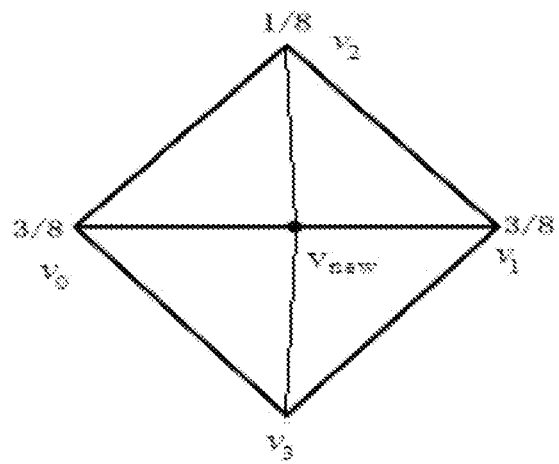
FIG. 4A, FIG. 4B and FIG. 4C are diagrams illustrating one embodiment of simplifying triangulated grids using a loop triangular grid function.
Figure 4B:
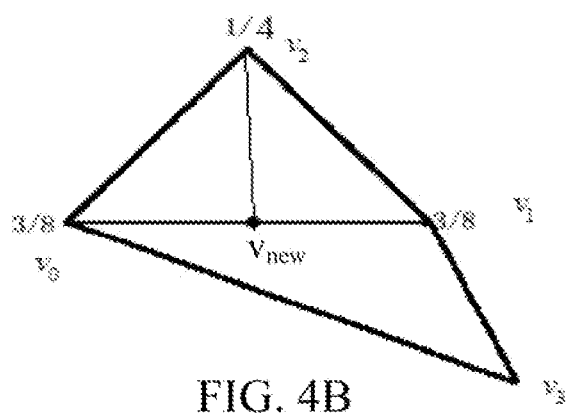

With reference to FIG. 4A, in at least one embodiment, the grid simplifying module 103 determines two neighboring vertexes, $V_0$ and $V_1$, for each of the triangulated grids, and uses the two neighboring vertexes $V_0$ and $V_1$ to form a side of the triangulated grid. If two neighboring triangles share a side of the triangulated grid, the grid simplifying module 103 determines a first triangle $\Delta V_0 V_1 V_2$ and a second triangle $\Delta V_0 V_1 V_3$ neighboring the first triangle $\Delta V_0 V_1 V_2$. The grid simplifying module 103 determines four angles of two neighboring triangles, where the four angles are denoted as $\angle v_2 v_1 v_0, \angle v_2 v_0 v_1, \angle v_3 v_1 v_0, \angle v_3 v_0 v_1$. As shown in FIG. 4A, if each of four angles is a sharp angle, the grid simplifying module 103 generates a new vertex denoted as $$v_{new} = \frac{3}{8}(v_0 + v_1) + \frac{1}{8}(v_2 + v_3)$$

in the side of the triangulated grid. As shown in FIG. 4B, if one of four angles is not a sharp angle, the grid simplifying module 103 generates a new vertex denoted as $$v_{new} = \frac{3}{8}(v_0 + v_1) + \frac{1}{4}v_3$$

in the side of the triangulated grid. If two of four angles are not sharp angles, no new vertex is generated in the side of the triangulated grid.

Figure 4C:
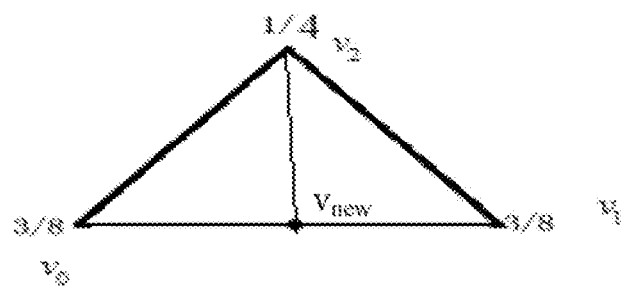

With reference to FIG. 4C, if only one triangle adjoins the side of a triangulated grid, the grid simplifying module 103 determines the triangle $\Delta V_0 V_1 V_2$ according to the side of the triangulated grid, and determines two angles sharing the side of the triangulated grid, where the two angles are denoted as $\angle v_2 v_1 v_0, \angle v_2 v_0 v_1$. As shown in FIG. 4C, if each of two angles is a sharp angle, the grid simplifying module 103 generates a new vertex denoted as $$v_{new} = \frac{3}{8}(v_0 + v_1) + \frac{1}{4}v_3$$

in the side of the triangulated grid. If one of two angles is not a sharp angle, no new vertex is generated in the side of the triangulated grid.

The grid simplifying module 103 further performs the loop triangular grid function on each side of the triangulated grids to generate a plurality of new vertexes, and connects the plurality of new vertexes to original vertexes of each triangulated grid to generate a plurality of simplified grids in the point cloud.

At block 25, the point cloud processing module 104 smoothes the simplified grids to obtain a point cloud model of the object, and displays the cloud model of the object on the display device 14. In at least one embodiment, the point cloud processing module 104 uses a preset smoothing method to smooth the simplified grids, and generates point cloud model of the object according to the smoothed grids. The preset smoothing method can be, but is not limited to, adjusting directions of vertexes of each smoothed grid until the grids satisfy a required accuracy of smoothness. The required accuracy of smoothness can be preset according to users requirements.

All of the processes described above may be embodied in, and fully automated via, functional code modules executed by one or more general purpose processors of computing devices. The code modules may be stored in any type of non-transitory readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size, and arrangement of parts within the principles of the present disclosure, up to and including the full extent established by the broad general meaning of the terms used in the claims.

What is claimed is:

1. A computing device comprising:
an input device, a display device, and at least one processor; and
a storage device storing a computer-readable program comprising instructions that, when executed by the at least one processor, causes the at least one processor to performing operations comprising:
obtaining a point cloud of an object and converting the point cloud into a plurality of triangulated grids using a plurality of triangles;
selecting a part of the triangulated grids from the point cloud to be simplified, and receiving a number of simplification passes to simplify the triangulated grids from the input device;
classifying the triangulated grids into different types of triangles according to a shape of each grid and a location of each grid in the point cloud;
simplifying each type of the triangulated grids to obtain a plurality of simplified grids by performing a loop triangular grid function with the number of simplification passes; and
smoothing the simplified grids to obtain a point cloud model of the object, and displaying the cloud model of the object on the display device;

wherein the loop triangular grid function is performed by operations of:
determining two neighboring vertexes $V_0$ and $V_1$ for each of the triangulated grids, and using two neighboring vertices $V_0$ and $V_1$ to form a side of the triangulated grid;
if two neighboring triangles share with the side of the triangulated grid, determining a first triangle $\Delta V_0 V_1 V_2$ and a second triangle $\Delta V_0 V_1 V_3$ neighboring to the first triangle $\Delta V_0 V_1 V_2$, determining four angles of two neighboring triangles, generating a new vertex denoted as $$v_{new} = \frac{3}{8}(v_0 + v_1) + \frac{1}{8}(v_2 + v_3)$$

in the side of the triangulated grid if each of four angles is a sharp angle; generating a new vertex denoted as $$v_{new} = \frac{3}{8}(v_0 + v_1) + \frac{1}{4}v_3$$

in the side of the triangulated grid if one of four angles is not a sharp angle, and no new vertex being generated in the side of the triangulated grid if two of four angles are not a sharp angle;
if only one triangle adjoins the side of the triangulated grid, determining the triangle $\Delta V_0 V_1 V_2$ according to the side of the triangulated grid, and determining two angles shared with side of the triangulated grid, generating a new vertex denoted as $$v_{new} = \frac{3}{8}(v_0 + v_1) + \frac{1}{4}v_3$$

if each of two angles is a sharp angle, and no new vertex being generated in the side of the triangulated grid if one of two angles is not a sharp angle; and
performing the loop triangular grid function on each side of each triangulated grid to generate a plurality of new vertexes, and connecting the plurality of new vertexes with original vertexes of each triangulated grid to generate the simplified grids in the point cloud.

2. The computing device according to claim 1, wherein the computing device connects to a scanning device through a communication connection or a communication network.

3. The computing device according to claim 2, wherein the scanning device measures a plurality of points to generate the point cloud of the object by scanning a surface of the object, and stores the point cloud of the object in the storage device.

4. The computing device according to claim 3, wherein the point cloud of the object is obtained from the scanning device or the storage device.

5. The computing device according to claim 1, wherein each of the triangulated grids is classified using a vertex classifying method and a plane classifying method.

6. A method for simplifying point clouds of an object using a computing device, the method comprising:
obtaining a point cloud of the object and converting the point cloud into a plurality of triangulated grids using a plurality of triangles;

selecting a part of the triangulated grids from the point cloud to be simplified, and receiving a number of simplification passes to simplify the triangulated grids from an input device of the computing device;

classifying the triangulated grids into different types of triangles according to a shape of each grid and a location of each grid in the point cloud;

simplifying each type of the triangulated grids to obtain a plurality of simplified grids by performing a loop triangular grid function with the number of simplification passes; and smoothing the simplified grids to obtain a point cloud model of the object, and displaying the cloud model of the object on a display device of the computing device;

wherein the loop triangular grid function is performed by operations of:

determining two neighboring vertexes $V_0$ and $V_1$ for each of the triangulated grids, and using two neighboring vertices $V_0$ and $V_1$ to form a side of the triangulated grid;

if two neighboring triangles share with the side of the triangulated grid, determining a first triangle $\Delta V_0 V_1 V_2$ and a second triangle $\Delta V_0 V_1 V_3$ neighboring to the first triangle $\Delta V_0 V_1 V_2$, determining four angles of two neighboring triangles, generating a new vertex denoted as $$v_{new} = \frac{3}{8}(v_0 + v_1) + \frac{1}{8}(v_2 + v_3)$$

in the side of the triangulated grid if each of four angles is a sharp angle; generating a new vertex denoted as $$v_{new} = \frac{3}{8}(v_0 + v_1) + \frac{1}{4}v_3$$

in the side of the triangulated grid if one of four angles is not a sharp angle, and no new vertex being generated in the side of the triangulated grid if two of four angles are not a sharp angle;

if only one triangle adjoins the side of the triangulated grid, determining the triangle $\Delta V_0 V_1 V_2$ according to the side of the triangulated grid, and determining two angles shared with side of the triangulated grid, generating a new vertex denoted as $$v_{new} = \frac{3}{8}(v_0 + v_1) + \frac{1}{4}v_3$$

if each of two angles is a sharp angle, and no new vertex being generated in the side of the triangulated grid if one of two angles is not a sharp angle; and performing the loop triangular grid function on each side of each triangulated grid to generate a plurality of new vertexes, and connecting the plurality of new vertexes with original vertexes of each triangulated grid to generate the simplified grids in the point cloud.

7. The method according to claim 6, wherein the computing device connects to a scanning device through a communication connection or a communication network.

8. The method according to claim 7, wherein the scanning device measures a plurality of points to generate the point cloud of the object by scanning a surface of the object, and stores the point cloud of the object in a storage device of the computing device.

9. The method according to claim 8, wherein the point cloud of the object is obtained from the scanning device or the storage device.

10. The method according to claim 6, wherein each of the triangulated grids is classified using a vertex classifying method and a plane classifying method.

11. A non-transitory storage medium having stored thereon instructions that, when executed by at least one processor of a computing device, causes the least one processor to execute instructions of a method for simplifying point clouds of an object, the method comprising:

obtaining a point cloud of the object and converting the point cloud into a plurality of triangulated grids using a plurality of triangles;

selecting a part of the triangulated grids from the point cloud to be simplified, and receiving a number of simplification passes to simplify the triangulated grids from an input device of the computing device;

classifying the triangulated grids into different types of triangles according to a shape of each grid and a location of each grid in the point cloud;

simplifying each type of the triangulated grids to obtain a plurality of simplified grids by performing a loop triangular grid function with the number of simplification passes; and smoothing the simplified grids to obtain a point cloud model of the object, and displaying the cloud model of the object on a display device of the computing device;

wherein the loop triangular grid function is performed by operations of:

determining two neighboring vertexes $V_0$ and $V_1$ for each of the triangulated grids, and using two neighboring vertices $V_0$ and $V_1$ to form a side of the triangulated grid;

if two neighboring triangles share with the side of the triangulated grid, determining a first triangle $\Delta V_0 V_1 V_2$ and a second triangle $\Delta V_0 V_1 V_3$ neighboring to the first triangle $\Delta V_0 V_1 V_2$, determining four angles of two neighboring triangles, generating a new vertex denoted as $$v_{new} = \frac{3}{8}(v_0 + v_1) + \frac{1}{8}(v_2 + v_3)$$

in the side of the triangulated grid if each of four angles is a sharp angle; generating a new vertex denoted as $$v_{new} = \frac{3}{8}(v_0 + v_1) + \frac{1}{4}v_3$$

in the side of the triangulated grid if one of four angles is not a sharp angle, and no new vertex being generated in the side of the triangulated grid if two of four angles are not a sharp angle;

if only one triangle adjoins the side of the triangulated grid, determining the triangle $\Delta V_0 V_1 V_2$ according to the side of the triangulated grid, and determining two angles shared with side of the triangulated grid, generating a new vertex denoted as $$v_{new} = \frac{3}{8}(v_0 + v_1) + \frac{1}{4}v_3$$

if each of two angles is a sharp angle, and no new vertex being generated in the side of the triangulated grid if one of two angles is not a sharp angle; and performing the loop triangular grid function on each side of each triangulated grid to generate a plurality of new vertexes, and connecting the plurality of new vertexes with original vertexes of each triangulated grid to generate the simplified grids in the point cloud.

12. The non-transitory storage medium according to claim 11, wherein the computing device connects to a scanning device through a communication connection or a communication network.

13. The non-transitory storage medium according to claim 12, wherein the scanning device measures a plurality of points to generate the point cloud of the object by scanning a surface of the object, and stores the point cloud of the object in a storage device of the computing device.

14. The non-transitory storage medium according to claim 13, wherein the point cloud of the object is obtained from the scanning device or the storage device.

15. The non-transitory storage medium according to claim 11, wherein each of the triangulated grids is classified using a vertex classifying method and a plane classifying method.

* * * * *